US00RE34453E

United States Patent [19]

Kamitani et al.

[11] E Patent Number: Re. 34,453

[45] Reissued Date of Patent: Nov. 23, 1993

[54] PHOTOGRAPHIC CAMERA

[75] Inventors: Masatoshi Kamitani, Osaka; Manabu Inoue; Motohiro Nakanishi, both of Kobe; Hiroshi Ootsuka; Yoshinobu Kudo, both of Sakai; Yoshiaki Hata, Toyonaka, all of Japan

[73] Assignee: Minolta Camera Kabushiki Kaisha, Osaka, Japan

[21] Appl. No.: 658,696

[22] Filed: Feb. 21, 1991

Related U.S. Patent Documents

Reissue of:

[64] Patent No.: 4,806,961
Issued: Feb. 21, 1989
Appl. No.: 196,809
Filed: May 18, 1988

U.S. Applications:

[63] Continuation of Ser. No. 106,586, Oct. 6, 1987, abandoned.

[30] Foreign Application Priority Data

Oct. 11, 1986 [JP] Japan ..... 61-241644

[51] Int. Cl.[5] ..... G03B 3/10

[52] U.S. Cl. ..... 354/195.1; 354/202; 354/295

[58] Field of Search ..... 354/195.1, 202, 295

[56] References Cited

U.S. PATENT DOCUMENTS

| | | | |
|---|---|---|---|
| 2,358,321 | 9/1944 | Fassin | 95/32 |
| 3,613,544 | 10/1971 | Plihal et al. | 95/45 |
| 4,002,405 | 1/1977 | Stahl | 350/187 |
| 4,171,894 | 10/1979 | Yamada | 354/187 |
| 4,264,174 | 4/1981 | Lange et al. | 354/187 |
| 4,410,253 | 10/1983 | Tsuboi | 354/195 |
| 4,522,478 | 6/1985 | Kando et al. | 354/288 |
| 4,597,657 | 7/1986 | Wakabayashi | 354/195.1 X |
| 4,864,338 | 5/1989 | Wakabayashi | 354/187 |

FOREIGN PATENT DOCUMENTS

| | | |
|---|---|---|
| 41-74 | 1/1961 | Japan . |
| 51-40459 | 11/1975 | Japan . |
| 55-77708 | 6/1979 | Japan . |
| 58-34440 | 2/1981 | Japan . |
| 56-165107 | 12/1981 | Japan . |
| 57-196223 | 2/1982 | Japan . |
| 57-196222 | 12/1982 | Japan . |
| 58-38133 | 3/1983 | Japan . |
| 59-165040 | 9/1984 | Japan . |
| 60-78432 | 4/1985 | Japan . |
| 62-264034 | 11/1987 | Japan . |
| 62-193228 | 12/1987 | Japan . |
| WO87/07038 | 11/1987 | World Int. Prop. O. . |

OTHER PUBLICATIONS

Article from Oct. 1984 issue of magazine "Shashin-Kogaku".

*Primary Examiner*—Michael L. Gellner
*Assistant Examiner*—David M. Gray
*Attorney, Agent, or Firm*—Burns, Doane, Swecker & Mathis

[57] ABSTRACT

A photographic camera having a photographic lens system freely settable to various focal lengths, an openable and closable lens cover disposed in front of the photographic lens system, an opening and closing mechanism for the lens cover, a motor for providing kinetic energy for the focal length changeover operations of the photographic lens system and also for the opening and closing operations of the lens cover, and a drivable cylinder capable of transmitting the kinetic energy from the motor to the photographic lens system and to the opening and closing mechanism in the form of a mechanical displacement. The opening and closing mechanism opens the lens cover by utilizing a mechanical displacement from a home position to an intermediate position of the drivable cylinder and closes the same by utilizing a mechanical displacement from the intermediate position to the home position of the drivable cylinder, and further changes over a focal position by utilizing mechanical displacements reversibly between the intermediate position and an end position of the drivable cylinder.

31 Claims, 5 Drawing Sheets

PHOTOGRAPHIC CAMERA

Matter enclosed in heavy brackets [ ] appears in the original patent but forms no part of this reissue specification; matter printed in italics indicates the additions made by reissue.

This application is a continuation, of application Ser. No. 106,586, filed Oct. 9, 1987, now abandoned.

BACKGROUND OF THE INVENTION

1. Field of the Invention present invention relates to a focal-length switchable photographic camera, and more particularly to a photographic camera having a focal length changeover mechanism for switching a focal length of a photographic lens, a linking member for operatively connecting the focal length changeover mechanism to a motor and a lens cover for covering and uncovering a front face of the photographic lens.

2. Description of the Prior Art

In the case of the above-described type of camera, it is a known arrangement to provide a manually operable cover opening lever for opening and closing a lens cover. More specifically, there is also provided an operative member having a cam face and there is implanted in the lens cover a pin for coming into contact with the cam face. And a spring is provided for urging the lens cover to be freely openable.

In operation, when the cover opening lever is manually shifted, the cam face of the operative member depresses the pin of the lens cover thereby closing the lens cover against the urging force of the spring. On the other hand, when the cover opening lever is reversely shifted, the depression between the cam face and the pin is released thereby opening the lens cover by means of the urging force of the spring (e.g. Japanese patent application publication under 60-78432).

In the case of so-called compact cameras, it is known that the opening and closing operations of the lens cover are automatically carried out with the lens cover being operatively connected with a film winding-up motor.

However, there are problems as follows with the above-described prior-art arrangements.

Referring to the former arrangement in which the lens cover is opened and closed by means of the manually operable member, this type of manually operable member is usually disposed at a position readily operable by a user's finger, the position being distant from the lens cover. Because of this, a mechanism for operatively connecting the cover and the member tends to be complicated and also to adversely effect the positional arrangement of other units inside the camera. On the other hand, if the manually operable member is positioned adjacent the lens cover, the same is difficult to operate by the finger.

Problems with the latter arrangement in which the, lens cover is opened and closed being operatively connected with the film winding-up motor will be described next. Since the film is wound up by the rotation of the motor and this film winding-up operation is carried out for each photographing operation, in order to open and close the film cover by the rotation of the film winding-up motor, it is necessary to provide in the transmission mechanism for opening and closing the lens cover a clutch for disengaging the operative connection between the cover and the motor during a film winding-up operation. Therefore, such transmission mechanism tends to be complicated.

SUMMARY OF THE INVENTION

It is the object of the present invention to provide a photographic camera is which a lens cover may be readily and conveniently opened and closed through a simple structural combination.

For accomplishing the above object, a photographic camera related to the present invention comprises a photographic lens system freely settable to various focal lengths, an openable and closable lens cover disposed in front of the photographic lens system, opening and closing means for the lens cover, a motor for providing kinetic energy for the focal length changeover operations of the photographic lens system and also for the opening and closing operations of the lens cover, and linking means capable of transmitting the kinetic energy from the motor to the photographic lens system and to the opening and closing means in the form of a mechanical displacement, wherein the opening and closing means opens the lens cover by utilizing a mechanical displacement from a home position to an intermediate position of the linking means and closes the same by utilizing a mechanical displacement from the intermediate position to the home position of the linking means, and further changes over a focal position by utilizing mechanical displacements reversibly between the intermediate position and an end position of the linking means.

With the above construction, the focal length changeover operation is carried out in a predetermined range and therefore the displacement amount of the linking means needed for changing over the focal length of the camera can be limited in a predetermined range. According to a further embodiment of the present invention, the photographic camera further comprises a first loose mechanism disposed in a contact region between the linking means and the opening and closing means and adapted for inhibiting a predetermined amount of displacement of the linking means from being transmitted to the opening and closing means, and still further comprises a second loose mechanism disposed in a contact region between the linking means and the lens system and adapted for inhibiting a predetermined amount of displacement of the linking means from being transmitted to the lens system, whereby the lens cover may be opened and closed by utilizing a portion of the displacement amount of the linking means and at the same time the focal length may be changed over by utilizing another portion of the same.

In addition, since the focal length changeover mechanism provided for the photographic lens system, to describe specifically, is adapted for moving a lens in the direction of the optical axis or for projecting or retracting an auxiliary lens along the optical axis of a main lens and also since the linking means for operatively connecting this focal length changeover mechanism to the motor is disposed adjacent a lens barrel on which the lens cover is mounted, the lens cover opening-closing mechanism may be simply constructed.

Furthermore, another advantage accrues according to another embodiment of the present invention. That is, if an electric switch is employed as a trigger means for the lens cover opening and closing means, it becomes possible to avoid uses of any complicated mechanical linking construction and the trigger means may be conveniently disposed at any desired place on the camera.

DESCRIPTION OF THE PREFERRED EMBODIMENTS

Preferred embodiments of the present invention will be particularly described hereinafter with reference to the accompanying drawings.

Figure 1:
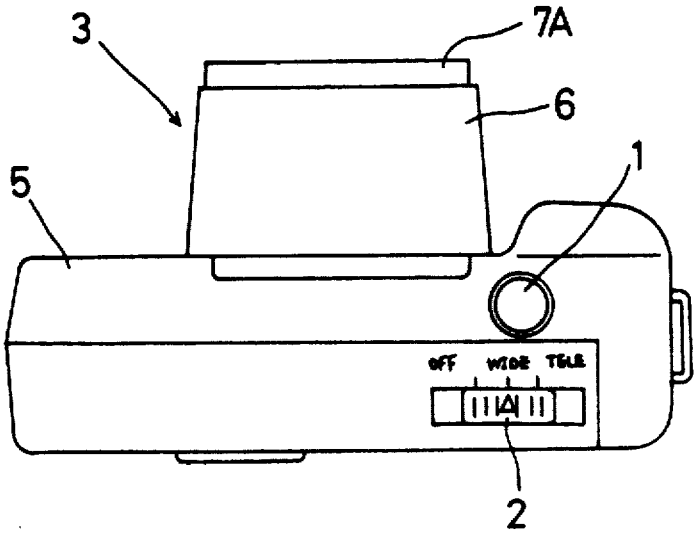
FIG. 1 is a plane view showing one preferred embodiment of a photographic camera related to the present invention.

FIG. 1 shows a photographic camera related to the present invention in which, a reference numeral 1 denotes a release button, a numeral 2 denotes a mode changeover switch and a reference numeral 3 denotes a photographic lens, respectively.

Referring to functions of the mode changeover switch 2, when switch 2 is set to a position 'TELE' a focal length of the photographic lens 3 becomes long (this condition will be referred to as a tele mode hereinafter); on the other hand, if the switch 2 is set to a position 'WIDE', the focal length of the photographic lens 3 becomes short (this condition will be referred to as a wide mode hereinafter).

Also, if this mode changeover switch 2 is set to a position 'OFF', a lens cover 4 for opening and closing a front face of the photographic lens 3 is closed and power supply to the respective components of the camera is stopped.

The photographic lens 3 includes a fixed cylinder 6 continuously attached to a camera body 5, a lens barrel 7 projectable and retractable relative to the fixed cylinder 6 and so on.

Figure 4:
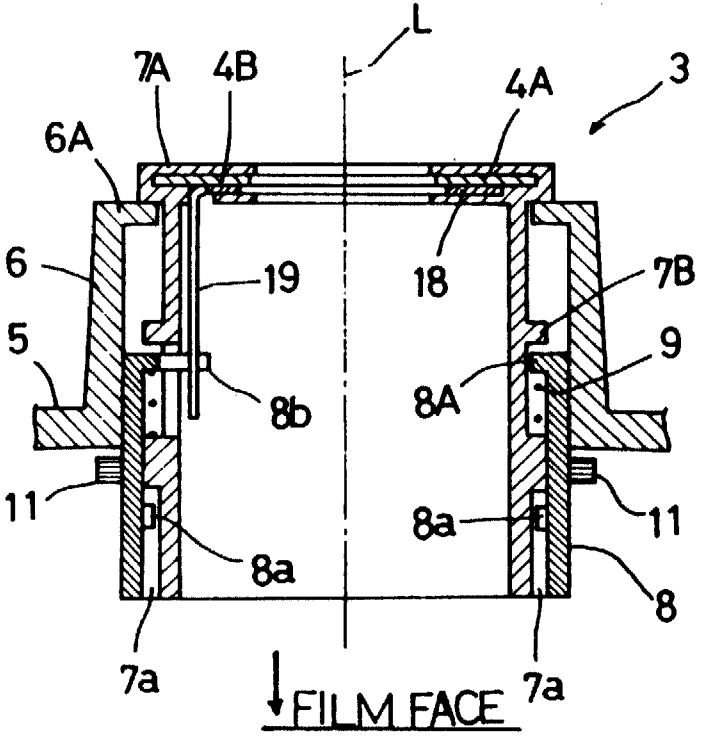
FIG. 4 is a sectional view of the photographic lens portion in the wide mode.
Figure 6:
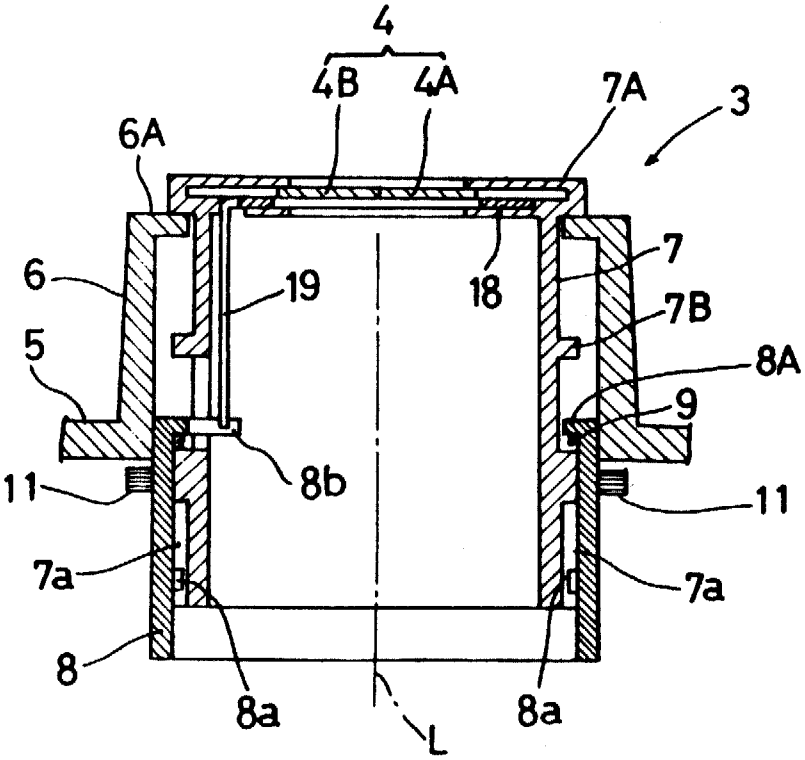
FIG. 6 is a sectional view of the photographic lens portion with the lens cover being closed.
Figure 8:
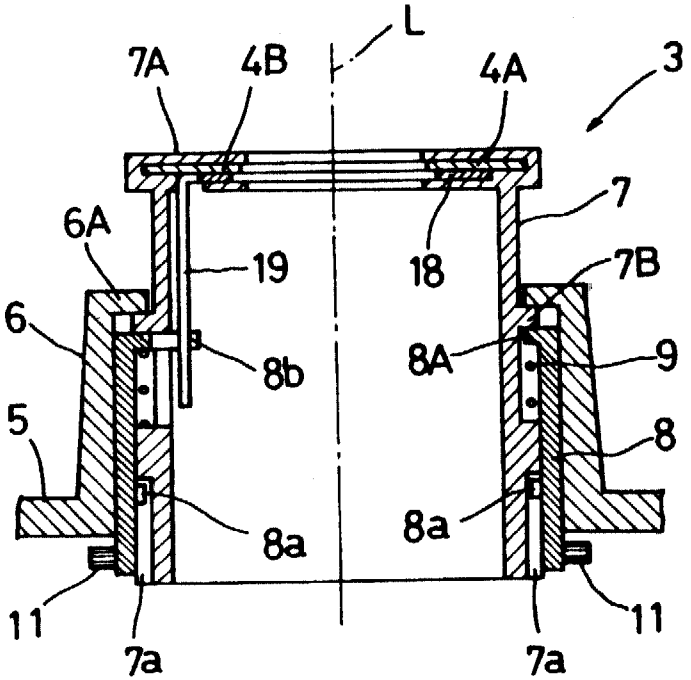
FIG. 8 is a section view of the photographic lens portion in the tele mode.

As shown in FIGS. 4, 6 and 8, into the fixed cylinder 6, a drivable cylinder 8 is engaged to be slidable in a direction of an optical axis 'L'. And, into this drivable cylinder 8, the lens barrel 7 is engaged to be slidable also in the direction of the optical axis 'L'.

The lens barrel 7 defines, at two positions on its outer peripheral face key grooves 7a along the direction of the optical axis 'L'. As these key grooves 7a respectively engage guide pins 8a attached to an inner peripheral face of the drivable cylinder 8, the lens barrel 7 and the drivable cylinder 8 are locked against rotation relative to each other. Further, in between the lens barrel 7 and the drivable cylinder 8, there are supported springs 9 for providing an urging force to separate the lens barrel 7 and the drivable cylinder 8 from each other in the direction of the optical axis 'L'.

Figure 3:
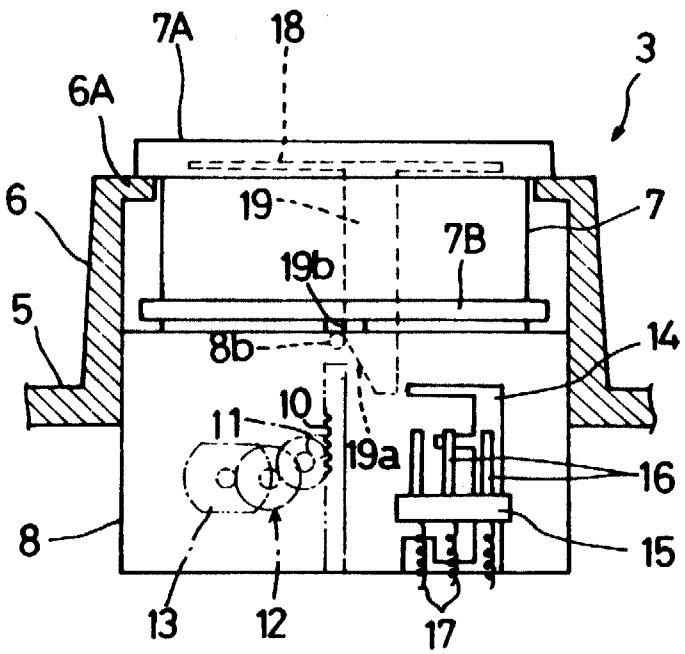
FIG. 3 is a partially cut-away view of a photographic lens portion in a wide mode.
Figure 5:
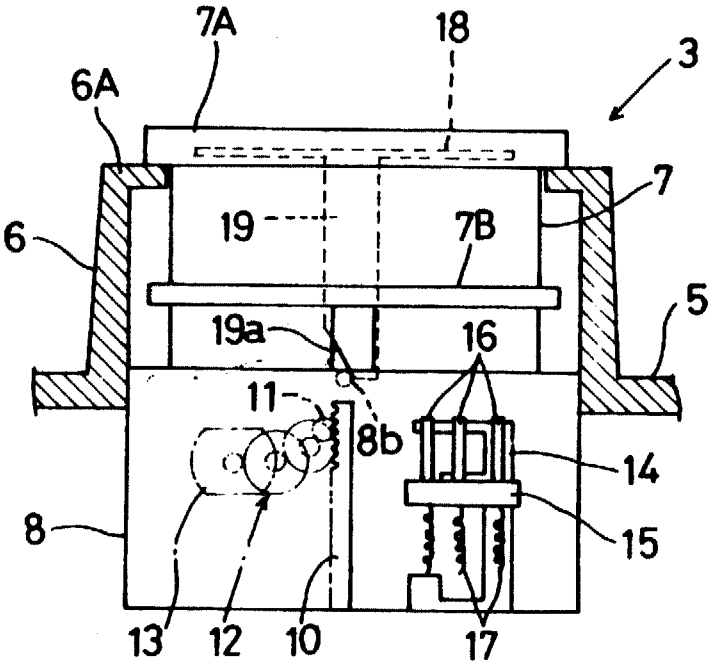
FIG. 5 is a partially cut-away side view of the photographic lens portion with the lens cover being closed.
Figure 7:
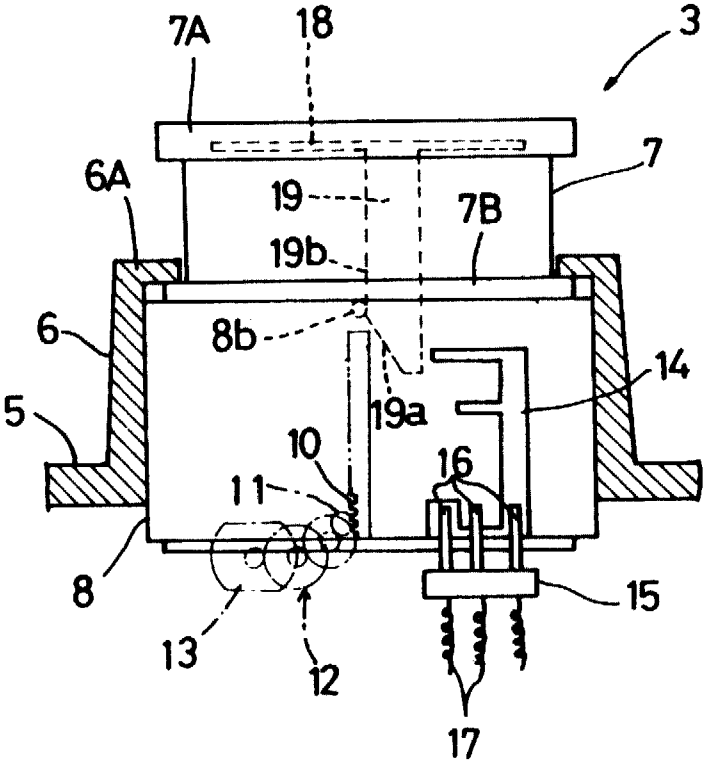
FIG. 7 is a partially cut-away side view of the photographic lens portion in a tele mode.

Also, as shown in FIGS. 3, 5 and 7, there are provided a pair of racks 10 along the direction of the optical axis 'L' at both sides of the outer peripheral face of the drivable cylinder 8. On the other hand, a pair of pinion gears 11 respectively engaging the pair of racks 10 are operatively connected through a reduction gear train 12 to a motor 13, whereby the drivable cylinder 8 is drivable in the direction of the optical axis 'L' by normal and reverse rotations of the motor 13.

To the outer peripheral face of the drivable 8, there is attached a position detecting pattern 14 having an electrically conductive film attached thereto. On the other hand, there are provided three position detecting brushes 16 extended from a holder 15 fixed to the camera body 5 such that these brushes 16 selectively come into contact with the position detecting pattern 14 with a movement of the drivable cylinder 8. These position detecting brushes 16 are connected via lead lines 17 to a control device (not shown).

In operation, as the drivable cylinder 8 moves, the conduction condition among the three position detecting brushes 16 varies to generate a 2 bit signal to the control device, whereby the control device detects the present position of the drivable cylinder 8 based on the particular 2 bit signal.

Figure 9:
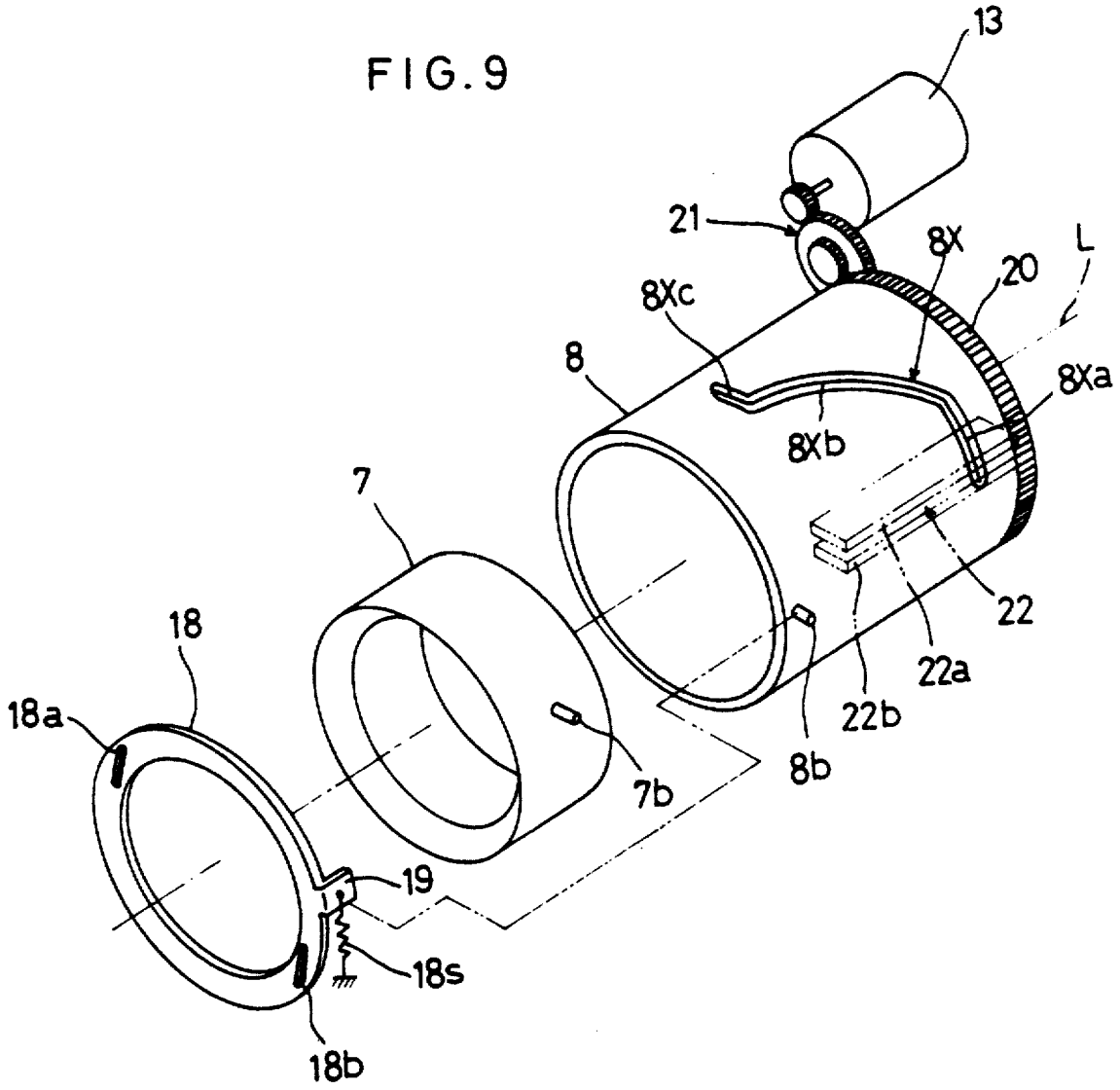
FIG. 9 is an exploded perspective view of a photographic lens portion of another preferred embodiment of the present invention.

The lens cover 4 for opening and closing the front face of the photographic lens 3, as shown in FIGS. 4, 6 and 9, is held in position inside a large radius portion 7A of a front edge of the lens barrel 7. Inside this large radius portion 7A, there is also held in position a cover opening ring 18 for opening and closing the lens cover 4.

Figure 2:
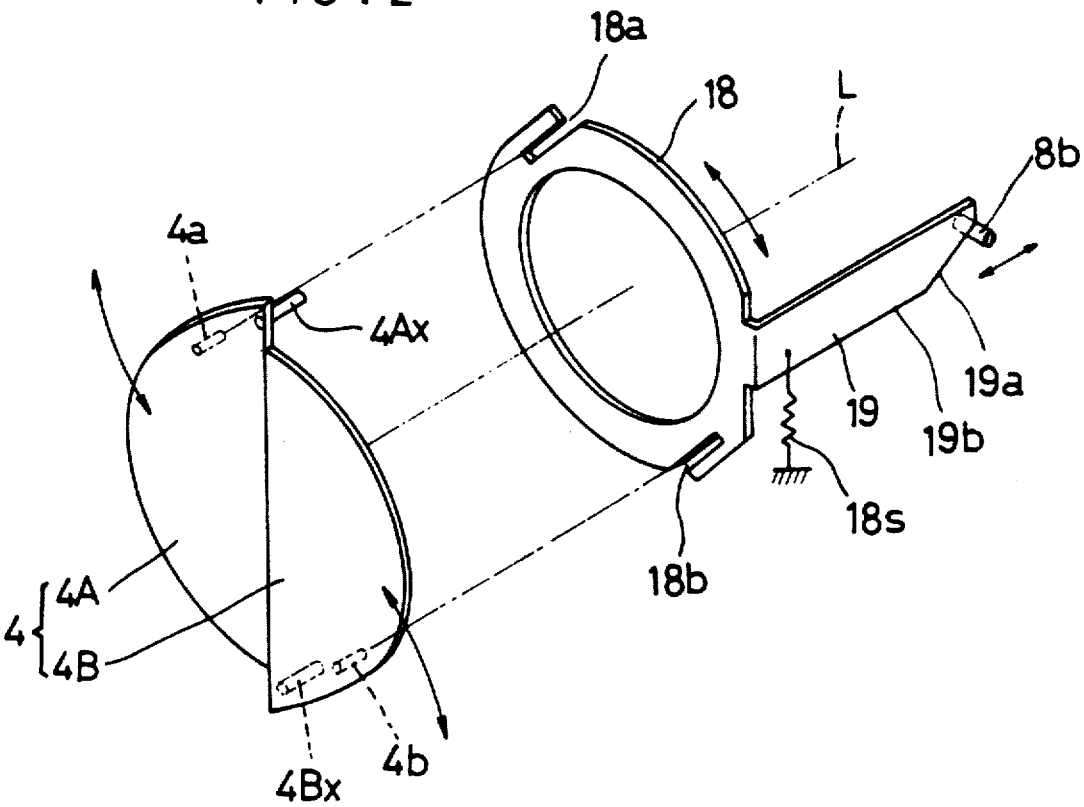
FIG. 2 is an exploded perspective view showing a lens cover portion.

Referring particularly to FIG. 2, the lens cover 4 includes a pair of cover elements 4A, 4B, which are rotatable respectively about mounting shafts 4Ax and 4Bx. Into these cover elements 4A and 4B, there are independently implanted cover openings pins 4a, 4b which respectively engage cam grooves 18a, 18b defined on the cover opening ring 18.

The cam grooves 18a, 18b are defined on the cover opening ring 18 in such a way as to gradually depart from a rotational center of the cover opening ring 18 in a clockwise direction in FIG. 2. Therefore, if the cover opening ring 18 is rotated in a counterclockwise direction when the lens cover 4 is closed, the cover opening pins 4a, 4b move along the cam grooves 18a, 18b and the pair of cover elements 4A and 4B are rotated in a clockwise direction respectively; about the mounting shafts 4Ax and 4Bx thereby opening the lens cover 4. On the other hand, if the cover opening ring 18 is rotated in the clockwise direction when the lens cover 4 is opened, with operations opposite to the above operations, the lens cover 4 is closed The cover opening ring 18 continuously forms a cover opening lever 19 which extends in the direction of the optical axis 'L'. And, as shown in FIGS. 2, 3 and 5, an inclined face 19a formed at a leading edge of this cover opening lever 19 is in contact with an operative pin 8b implanted in the inner peripheral face of the drivable cylinder 8.

Further, the cover opening ring 18 is urged by a spring 18s toward the direction (the clockwise direction in FIG. 2) in which the cover opening ring 18 is in contact with the operative pin 8b. That is to say, the lens cover 4 is urged to the closed position thereof.

FIGS. 3 and 4 show the wide mode condition of the camera in which the focal length of the photographic lens 3 is short and the lens cover 4 is opened.

In this condition, the lens barrel 7 is retracted in the fixed cylinder 6 by means of the urging force of the springs 9, and the lens barrel 7 is fixedly held in position as a rear face of the large radius portion 7A thereof is in contact with a flange 6A of a front edge of the fixed cylinder 6.

In this condition, if the mode changeover switch 2 is set to its 'OFF' position, the motor 13 starts its rotation thereby driving the drivable cylinder 8 to depress the spring 9 to move in a direction to come closer to a film face (the downward direction in the same figures). In connection therewith, the operative pin 8b of the drivable cylinder 8 moves also toward the film face, and the cover opening lever 19 urged by this operative pin 8b moves leftward in FIG. 3 as its inclined face 19a is guided by the operative pin 8b through mutual contact therebetween.

Thereby, as shown in FIG. 2, the cover opening ring 18 is rotated in the clockwise direction and, as described hereinbefore, the lens cover 4 is closed. When it is detected that the drivable cylinder 18 has reached its 'OFF' position as the position detecting brushes 16 reach a predetermined position of the position detecting pattern 14, the motor 13 stops its rotation. This condition is shown in FIGS. 5 and 6.

In this condition, if the mode changeover switch 2 is set to its 'WIDE' position, operations reverse to the above-described operations to be carried out. That is, the drivable cylinder 8 moves way from the film face and its operative pin 8b depresses the inclined face 19a of the cover opening lever 19 to rotate the cover opening ring 18, whereby the lens cover 4 is opened.

In the above operation, it is to be noted, the depressing force of the operative pin 8b onto the inclined face 19a of the lens opening cover 19 urges the lens barrel 7 to move away from the film face. However, the lens barrel 7 is stably held at its original position since the urging force of the spring 9 is stronger than the depressing force.

Further, in the wide mode condition shown in FIGS. 3 and 4, if the mode changeover switch 2 is set to its 'TELE' position, the motor 13 starts its rotation to drive the drivable cylinder 8 away from the film face (the upward direction in the same figures). Since there is provided free space between the flange 8A of the front edge of the drivable cylinder 8, and a flange 7B formed on the outer surface of the lens barrel 7, the lens barrel 7 is not moved as an initial stage of the above movement of the drivable cylinder 8 which is being urged by means of the spring 9 toward the film face.

After the flange 8A of the drivable cylinder 8 comes into contact with the flange 7B of the lens barrel 7, the drivable cylinder 8 and the lens barrel 7 together move away from the film face. When the flange 7B of the lens barrel 7 comes into contact with a flange 6A of the fixed cylinder 6, the lens barrel 7 is fixedly held in position and does not move any further. This condition is shown in FIGS. 7 and 8.

Immediately before the above operation, it is judged that the drivable cylinder 8 has reached a position adjacent its 'TELE' position as the position detecting brushes 16 reach a predetermined position of the position detecting pattern 14. For a predetermined time period upon the above detection, until the lens barrel 7 stops its movement as described above, the rotational drive of the motor 13 is operatively engaged. Though not shown, there is provided a slip mechanism in the reduction gear train 12 for protecting the motor 13 from overload.

In accordance with the changeover from the wide mode to the tele mode, the drivable cylinder 8 moves relative to the lens barrel 7 by a distance equivalent to the free space between the flanges 8A and 7B. Also, the operative pin 8b of the drivable cylinder 8 moves by this distance along a straight portion 19b of the lens opening lever 19 extending in the direction of the optical axis 'L'. Therefore, the cover opening ring 18 is not rotated and the lens cover 4 remains opened.

Also, through not shown, with the movement of the lens barrel 7 away from the film face, an auxiliary lens is inserted rearwardly into a main lens supported inside the lens barrel 7, and further with the above movement of the lens barrel 7, the main lens moves forwardly in the direction of the optical axis 'L', whereby the focal length of the photographic lens 3 becomes longer.

Other Preferred Embodiments

The construction for opening and closing the lens cover 4 and the construction for changing over the focal length may be conveniently modified.

In the previous embodiment, the drivable cylinder 8 is moved in the direction of the optical axis 'L'. In place of this, in an embodiment shown in FIG. 9, the drivable cylinder 8 is rotated about the optical axis 'L'.

The drivable cylinder 8 carries on the outer peripheral face thereof, an outer gear 20, which is operatively coupled via a reduction gear train 21 with the motor 13. Further, the drivable cylinder 8 defines on its peripheral face, a cam groove 8X, with which a guide pin 7b implanted in the outer peripheral face of the lens barrel 7, is engaged.

This guide pin 7b of the lens barrel 7 extends through the cam groove 8X to be engaged between a pair of plate members 22a, 22b which constitute a straight guide portion 22 fixed to the camera body (not shown in FIG. 9) and which extend in the direction of the optical axis 'L'.

At the leading edge of the outer peripheral face of the drivable cylinder 8, there is implanted the operative pin 8b, which is in contact with the cover opening lever 19 continuously provided to the cover opening ring 18 having the same construction as disclosed in the previous embodiment.

The cover opening ring 18, in the same manner as in the previous embodiment, is urged by means of a spring 18s clockwise in the same figure. The coupling construction between the cover opening ring 18 and the lens cover 4 is the same as that in the previous embodiment and therefore is not shown in FIG. 9.

Of the cam groove 8X of the drivable cylinder 8, a parallel portion 8Xa perpendicularly crossing the optical axis 'L', comprises a cover opening and closing area, and when the guide pin 8b is positioned at this parallel portion 8Xa, the photographic lens 3 is in the wide mode condition.

In operation, as the motor 13 rotatably drives the drivable cylinder 8, by the depressing force of the operative pin 8b onto the cover opening lever 19 against the urging force of the spring 18s or by the urging force of the spring 18, the cover opening ring 18 is rotated, and in the same manner as in the previous embodiment, the lens cover 4 is opened or closed. In the course of the above operations, the lens barrel 7 is not moved in the direction of the optical axis 'L'.

As the motor 13 further drives the drivable cylinder 8, the guide pin 7b of the lens barrel 7, as being regulated by the straight guide portion 22, reaches an inclined portion 8Xb of the cam groove 8X. As the guide pin 7b moves along the inclined portion 8Xb, the lens barrel 7 moves in the direction of the optical axis 'L'.

In the above operation, though not shown, the movement of the auxiliary lens is operatively coupled with the movement of the lens barrel 7, whereby the focal length is changed over, during which the lens cover 4 remains opened. Then, when the guide pin 7b reaches an end portion 8Xc of the cam groove 8X, the mode is switched to the tele mode.

The end portion 8Xc of the cam groove 8X is formed in parallel with the parallel portion 8Xa in a predetermined range, such that the photographic lens 3 is stopped at the same position relative to the direction of the optical axis 'L' despite slight irregularities in the stop position of the drivable cylinder 8.

For changing over the focal length, in the previous embodiment, the focal length longer than that obtainable solely by the main lens is obtained by moving the lens barrel 7 holding the main lens forwardly in the direction of the optical axis 'L' and at the same time by inserting the auxiliary lens rearwardly of the main lens. In place of this construction, it is also possible to obtain a focal length shorter than that obtainable solely by the main lens by moving the lens barrel 7 rearwardly in the direction of the optical axis 'L' and at the same time by inserting a different auxiliary lens rearwardly of the main lens.

The present invention may be adapted for a camera in which focal length may be changed step-free or through three positions.

If necessary, the lens cover 4 may be variably modified in its configuration, mounting construction or in its opening and closing construction. For example, it is possible to form the cover by more than three blades which may be opened or closed in the same manner as an iris diaphragm.

Further, as for the mode changeover switch 2, in place of the slide type described in the previous embodiment, it is also possible to form switch 2 as a push type key switch. In this case, there will be preferably provided a circuit for storing the condition of this key switch.

What is claimed is:

[1. A photographic camera comprising:

a photographic lens system freely settable to various focal lengths;

an openable and closable lens cover disposed in front of said photographic lens system;

opening and closing means for said lens cover;

motor means for providing kinetic energy for the focal length changeover operations of said photographic lens system and also for the opening and closing operations of said lens cover; and linking means capable of transmitting the kinetic energy from said motor means to said photographic lens system and to said opening and closing means in the form of a mechanical displacement;

wherein said opening and closing means operates:

to open said lens cover by utilizing a mechanical displacement from a home position to an intermediate position of said linking means, to close said lens cover by utilizing a mechanical displacement from the intermediate position to the home position of said linking means, and to change over a focal position by utilizing mechanical displacements reversibly between the intermediate position and an end position of said linking means.]

[2. A photographic camera, as defined in claim 1, wherein said linking means is linearly displaced by said motor means in the direction of the optical axis of said lens system.]

[3. A photographic camera, as defined in claim 1, wherein said linking means is rotatably displaced by said motor means about the optical axis of said lens system.]

[4. A photographic camera, as defined in claim 1, further comprising:

a first loose mechanism disposed in a contact region between said linking means and said opening and closing means and adapted for inhibiting a predetermined amount of displacement of said linking means from being transmitted to said opening and closing means; and a second loose mechanism disposed in a contact region between said linking means and said lens system and adapted for inhibiting a predetermined amount of displacement of said linking means from being transmitted to said lens system.]

[5. A photographic camera, as defined in claim 1, wherein said lens system is capable of step-free changing over a focal length thereof.]

[6. A photographic camera, as defined in claim 1, wherein said lens system is capable of changing over a focal length thereof in a plurality of steps.]

[7. A photographic camera comprising:

a photographic lens system;

means for changing over the total focal length of said lens system;

an electrical driving means for driving said changing over means;

a lens cover movable between a position of covering a front face of said lens system and a position for uncovering said front face; and means for transmitting the driving force of said driving means to said lens cover thereby moving said lens cover between said covering and uncovering positions.]

[8. A photographic camera, as defined in claim 7, wherein said changing over means includes operating means operable in a first range and in a second range by the driving force of said driving means such that said operating means changes over the focal length of said lens system by the operation in said first range and moves said lens cover through said transmitting means by the operation in said second range.]

[9. A photographic camera, as defined in claim 8, wherein at least a front element of said lens system is movable between a position projecting forward from a camera body and a position retracted backward from said projecting position for performing the changing over of the focal length and wherein said first element is stationed at said retracted position when said operating means is in said second range.]

[10. A photographic camera, as defined in claim 9, wherein said operating means is movable along an optical axis of said lens system.]

[11. A photographic camera, as defined in claim 9, wherein said operating means is rotatable around an optical axis of said lens system and said operating means further includes cam means for moving said lens system along said optical axis in response to the rotation of said operating means.]

[12. A photographic camera, as defied in claim 7, wherein said lens system is so arranged that its focal length is mutually changed over between a predetermined shorter focal length and a predetermined longer focal length.]

[13. A photographic camera, as defined in claim 7, wherein said lens system is so arranged that its focal length is varied continuously.]

[14. A photographic camera comprising:

a photographic lens system;

means for changing over the total focal length of said lens system;

lens cover means movable between positions for covering and uncovering a front face of said lens system;

motor means for providing kinetic energy; and linking means capable of transmitting the kinetic energy from said motor means to said lens cover means for moving said lens cover means into said uncovering position in response to a mechanical displacement from a home position to an intermediate position of said linking means and for moving said lens cover means into said covering position in response to a mechanical displacement from said intermediate position to said home position of said linking means, and capable of transmitting the kinetic energy from said motor to said changing over means in response to a mechanical displacement between said intermediate position and an end position of said linking means.]

*15. A photographic camera comprising:*

*a photographic lens system freely settable to various focal lengths;*

*an openable and closable lens cover disposed in front of said photographic lens system;*

*opening and closing means for said lens cover;*

*motor means for providing kinetic energy for the focal length changeover operations of said photographic lens system and also for the opening and closing operations of said lens cover;*

*linking means capable of transmitting the kinetic energy from said motor means to said photographic lens system and to said opening and closing means in the form of mechanical displacement, said motor means displacing said linking means linearly in the direction of the optical axis of the lens system, wherein said opening and closing means operates:*

*to open said lens cover by utilizing a mechanical displacement from a home position to an intermediate position of said linking means, and*

*to close said lens cover by utilizing a mechanical displacement from the intermediate position to the home position of said linking means,*

*and wherein said linking means operates:*

*to change over a focal position by utilizing mechanical displacements reversibly between the intermediate position and an end position of said linking means; and*

*contact means for causing said opening and closing means to open the lens cover when the linking means moves from the home position to the intermediate position and for causing the opening and closing means to close the lens cover when the linking means moves from the intermediate position to the home position, wherein the position of said contact means is substantially fixed in a direction transverse to the optical axis of the lens system.*

*16. The photographic camera according to claim 15, wherein said linking means includes a cylinder having at least one rack extending axially along an outer peripheral surface thereof.*

*17. The photographic camera according to claim 16, including a reduction gear train that operatively connects the motor means to the rack to thereby cause the cylinder to move axially in the direction parallel to the optical axis of the lens system.*

*18. The photographic camera according to claim 16, wherein said contact means includes an operative pin connected to and extending inwardly from an inner surface of the cylinder.*

*19. The photographic camera according to claim 18, wherein said opening and closing means includes a cover opening ring positioned in a front portion of a lens barrel, said lens barrel being slidably positioned in the cylinder and said cover opening ring having a cover opening lever extending therefrom.*

*20. The photographic camera according to claim 19, including means connected to the cover opening ring for biasing the cover opening ring in a first rotational direction, said cover opening lever having a free end remote from the cover opening ring that is inclined.*

*21. The photographic camera according to claim 20, wherein said cover opening ring includes two generally oppositely positioned cam grooves formed in the outer periphery thereof, each of said cam grooves gradually departing from a rotational center of the cover opening ring in said first direction and each of said cam grooves opening to the periphery of the cover opening ring.*

*22. The photographic camera according to claim 21, wherein said lens cover includes two cover elements rotatably mounted in the front portion of the lens barrel so as to be rotatable about respective rotation axes, each of said cover elements having a cover opening pin extending therefrom that engages one of the cam grooves formed in the cover opening ring so that movement of the cylinder from the home position to the intermediate position causes said operative pin to move axially and engage the inclined end of the cover opening lever to thereby cause the cover opening lever and the cover opening ring to rotate in a direction opposite to said first direction whereby said two cover elements are caused to rotate about their respective rotation axes away from one another in response to camming action of the cam grooves with respect to the cover opening pins.*

*23. The photographic camera according to claim 15, wherein said lens cover is mounted in a front portion of a lens barrel and including a cylinder in which is slidably positioned the lens barrel, said lens barrel having grooves formed in an outer peripheral surface thereof and extending in a direction substantially parallel to the optical axis, said cylinder having guide pins extending from an inner surface thereof, said guide pins engaging the grooves formed in the outer peripheral surface of the lens barrel.*

*24. The photographic camera according to claim 23, wherein said lens barrel has a flange extending outwardly therefrom and said cylinder has a flange extending outwardly therefrom, and including means interposed between the flange on the cylinder and the flange on the lens barrel for urging the lens barrel and the cylinder away from one another.*

*25. The photographic camera according to claim 15, wherein said lens cover includes two rotatably mounted cover elements which are rotatable about respective mounting shafts, each of said cover elements having a cover open-*

*ing pin extending therefrom that is adapted to be engaged by said opening and closing means to pivot the two cover elements away from one another and about their respective mounting shafts to thereby open the lens cover.*

*26. The photographic camera according to claim 25, wherein said opening and closing means includes a cover opening ring positioned in a front portion of a lens barrel, said cover opening ring having a cover opening lever extending therefrom.*

*27. The photographic camera according to claim 26, and including means connected to the cover opening ring for biasing the cover opening ring in a first rotational direction, said cover opening lever having a free end remote from the cover opening ring that is inclined.*

*28. The photographic camera according to claim 27, wherein said cover opening ring includes two generally oppositely positioned cam grooves formed in the outer periphery thereof, each of said cam grooves gradually departing from a rotational center of the cover opening ring in said first direction and each of said cam grooves opening to the periphery of the cover opening ring, said cam grooves being adapted to be engaged by one of the cover opening pins.*

*29. The photographic camera according to claim 15, wherein said opening and closing means includes a cover opening ring positioned in a front portion of a lens barrel and a cover opening lever extending rearward from the cover opening ring.*

*30. The photographic camera according to claim 29, wherein said contact means includes a pin and said cover opening lever has a free end remote from the cover opening ring that is inclined for contacting said pin.*

*31. The photographic camera according to claim 30, including biasing means for biasing said cover opening lever in a first direction, said inclined end of said cover opening lever being inclined in a direction for contacting said pin and for moving said cover opening lever in opposition to said first direction.*

* * * * *